UNITED STATES PATENT OFFICE 2,475,139

PROCESS FOR THE MANUFACTURE OF PENTAENES

Otto Isler and Albert Businger, Basel, Switzerland, assignors to Hoffmann-La Roche Inc., Nutley, N. J., a corporation of New Jersey No Drawing. Application February 18, 1947, Serial No. 729,398. In Switzerland February 27, 1946

15 Claims. (Cl. 260—617)

This invention relates to the manufacture of pentaenes.

Various syntheses of vitamin A have already been published. The published processes build up the carbon skeleton of vitamin A consisting of 20 carbon atoms as follows: 5-(2',6',6'-trimethyl-cyclohexene - (1')-yl) - 3-methyl-pentadiene-(2,4)-al-(1) is condensed with 3-methyl-butene-(2)-al-(1) ($C_{15}+C_5=C_{20}$; Berichte der Deutschen Chemischen Gesellschaft, vol. 70, year 1936, page 853). The same aldehyde $C_{15}$ or the chloride of the corresponding acid and methylvinyl ketone are condensed to malonic acid ester, the carboxyl groups being subsequently split off $$(C_{15}+C_4+C_1=C_{20})$$

U. S. Patent specification No. 2,369,158). Finally, 6-(2',6',6' - trimethyl - cyclohexene - (1')-yl)-4-methyl-hexadiene-(3,5)-yne-(1) and 6-(2',6',6'-trimethyl-cyclohexene - (1') - yl)-3-hydroxy-4-methyl-hexene-(4)-yne-(1) are condensed with methylvinyl ketone or with esters of 1-hydroxy-butanone-(3) ($C_{16}+C_4=C_{20}$; U. S. Patent specifications Nos. 2,369,156, 2,369,160–68, 2,382,085).

It has now been found, according to the present invention, that vitamin A and its esters can be obtained by condensing 4-(2',6',6'-trimethyl-cyclohexene - (1')-yl)-butene-(3)-one - (2) (beta-ionone) by means of a Grignard reaction with 3-hydroxy-3-methylhexene-(1)-yne-(5), adding 1 mol of hydrogen to the triple bond of the resulting condensation product, subjecting the 3,7-dihydroxy-3,7-dimethyl-9-(2',6',6'-trimethyl - cyclohexene-(1')-yl)-nonatriene-(1,5,8) thus obtained to allyl rearrangement and dehydration.

The synthesis may be expected to proceed according to the following formulae:

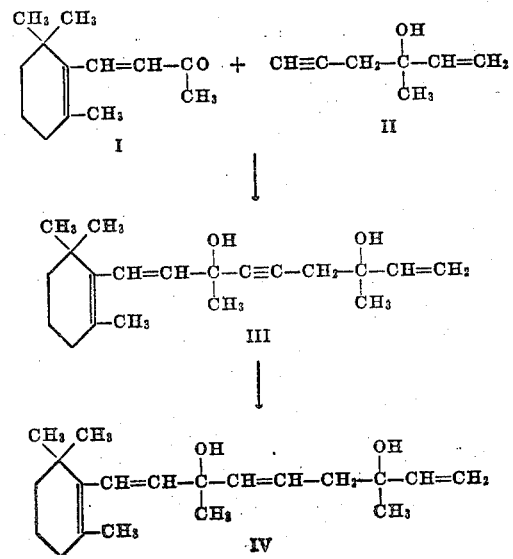

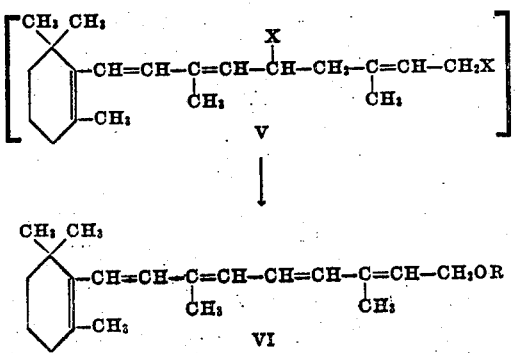

X=hydroxyl, acyloxy or halogen; R=hydrogen or acyl.

The synthesis of vitamin A and its esters, according to the present invention, is effected by uniting the two parts I and II with 13 and 7 carbon atoms, respectively, to a condensation product III with 20 carbon atoms. This condensation product contains a triple bond and three double bonds, of which only two are conjugated to each other. Therefrom, the sensitive system of vitamin A with the five double bonds conjugated to one another is formed by dehydration in the last reaction step after previous partial hydrogenation of the triple bond and two allyl rearrangements.

The starting material 3-hydroxy-3-methyl-hexene-(1)-yne-(5) was hitherto unknown. Its manufacture may, for instance, be effected from propargyl bromide and methylvinyl ketone:

1 mol of propargyl bromide and 2 to 4 mols of dry methylvinyl ketone are condensed in a benzene solution under the usual conditions of the Reformatsky reaction with 1 to 3 mols of zinc chips in boiling heat. The resulting zinc salt of this condensation product is treated with acids and the solvent is evaporated. The 3-hydroxy-3-methyl-hexene-(1)-yne-(5) can be distilled from the viscous residue in good yield. $n_D^{20}=1.460$; $d_4^{18}=0.916$. Boiling point 44–47° C./12 mm. The compound does not absorb any ultraviolet rays of greater wave length than 260 m$\mu$.

The first step of the present process consists of a Grignard reaction in which 3-hydroxy-3-methyl-hexene-(1)-yne-(5) is first reacted with 2 equivalents of alkyl magnesium halide (e. g., ethyl magnesium bromide). The resulting dimagnesium bromide compound is now condensed in the usual manner with beta-ionone. The reaction succeeds in the usual solvents, such as, for instance, ethyl ether. The reaction product is hydrolysed under careful conditions, for instance with an ammonium salt solution in the cold. Thereby, the reaction conditions must be chosen in such a way that no undesired splitting off of water takes place. Unchanged 3-hydroxy-3-methyl-hexene-(1)-yne-(5) can be evaporated in vacuo. The remaining crude product can be used further directly. For the purpose of obtaining the pure 3,7-dihydroxy-3,7-dimethyl-9-(2',6',6'-trimethyl - cyclohexene - (1') - yl) - nonadiene-(1,8)-yne-(5), the non-reacted beta-ionone is separated either in form of a crystallising derivative (e. g., semicarbazone) or by means of a percolation chromatogram, e. g., through a weakly active aluminum oxide column. The condensation product III, a yellow oil, thus obtained shows no or only slight absorption above 260 m$\mu$ in the ultra violet spectrum. The Zerewitinoff analysis yields values for two active hydrogen atoms.

3,7 - dihydroxy - 3,7-dimethyl-9-(2',6',6'-trimethyl-cyclohexene-(1') - yl)-nonadiene-(1,8)-yne-(5) is now subjected to partial hydrogenation of the triple bond. Here, too, care must be taken that no undesired splitting off of water occurs. To this end, compound III can be treated in alcoholic solution with zinc dust and aqueous potassium hydroxide. Catalytic hydrogenation has proved particularly advantageous for the selective absorption of 1 mol of hydrogen. As catalysts, there may, for instance, be suitably employed palladium-calcium carbonate, palladium-barium sulphate and paralladium charcoal, onto which quinoline has been adsorbed prior to use. If the crude condensation product is subjected to partial hydrogenation, hydrogenation is effected with a smaller quantity of hydrogen corresponding to the beta-ionone content. When the calculated quantity of hydrogen has been taken up, the addition of hydrogen is interrupted. The hydrogenated product, 3,7 - dihydroxy-3,7-dimethyl-9-(2',6',6'-trimethyl - cyclohexene - (1')-yl) - nonatriene-(1,5,8), which need not necessarily be purified, is a yellowish, viscous oil of $n_D^{17}=1.509$. In the ultraviolet absorption spectrum, it shows no or hardly any absorption above 260 m$\mu$. The Zerewitinoff anaylsis yields values for two active hydrogen atoms.

The condensation product obtained by partial hydrogenation is now rearranged and dehydrated; this is effected by the action of means causing a so-called allyl rearrangement (Hückel, "Theoretische Grundlagen der organischen Chemie," 4th edition, volume I, pages 297/98 et seq., Leipzig, 1943) and subsequent splitting off of water or acid, respectively. Each molecule is subjected to two allyl rearrangements. The hydroxyl group of compound IV in position 3 migrates into position 1, in given cases with simultaneous substitution, and the adjacent double bond migrates from position 1 into position 2. Furthermore, in an analogous manner, the hydroxyl group in position 7 migrates into position 5, and the double bond from position 5 into position 6. A method is chosen with as few undesired side-reactions (polymerisation, cyclisation and the like) as possible; thereby, special attention must be paid that undesired splitting off of water prior to the rearrangement is avoided as far as possible. Thus, 3,7-dihydroxy-3,7 - dimethyl - 9 - (2',6',6' - trimethyl-cyclohexene-(1')-yl)-nonatriene - (1,5,8) can be rearranged in this reaction step in a manner known per se., by acylation (with an organic acylation agent or a halogenation agent); for this reaction, the lower fatty acid anhydrides and the lower fatty acid halides are, for instance, suited. The rearrangements without substitution can be effected by heating, preferably in presence of a small quantity of iodine in a diluent having a boiling point of 80–120° C. The presence of strong organic carboxylic acids and mineral acids may prove to be a disadvantage, seeing that they can intensify the undesired cleavage prior to the rearrangement. The same danger exists when halogenating agents (e. g., phosphorus trihalides) are being used, in which case, according to the mode of application, the desired reaction may occur with a lower yield only. The intermediate products are deemed to correspond to Formula V. Isolation thereof is not necessary. If the subsequent dehydration has not already taken place under the rearrangement conditions, it is recommended, especially with regard to the halides which are rather unstable, to proceed with the further working-up without delay.

The introduction of a further double bond may be effected by splitting off water or acid, as the case may be, by allowing the free or esterified hydroxyl group in position 5, together with a hydrogen atom of the adjacent carbon atom in position 4, to be split off in the form of water or acid, respectively.

According to the rearrangement conditions chosen, the splitting-off of water or acid may take place in the same reaction step as the allyl rearrangement (e. g., when rearranging with a small quantity of iodine at temperatures of about 100° C.), or the splitting-off may be a separate step of the process. Thus, on boiling with acetic anhydride in presence of alkali acetate, the desired pentaene compound VI is directly obtained. If the allyl rearrangement is carried out at lower temperatures, for instance by the action of organic acylation agents below 100° C., acid or water may be split off in a following step from the resulting products of Formula V by heating. For the purpose of splitting off acid, the product is for instance heated in quinoline to 160–180° C. or boiled with tertiary potassium amylate in tertiary amyl alcohol. In order to split off water, it is of advantage to treat with a small quantity of iodine or of a compound which readily splits off iodine. From the halogeno compounds of Formula V, the secondary halogen atom is easily split off in the form of hydrogen halide. On the other hand, the transformation of the halide in position 1 into the hydroxy or acyloxy group may be effected in the usual manner, for instance with potassium acetate in glacial acetic acid solution.

As a result of these rearrangements and cleavages, pentaenes are obtained which, according to the rearrangement or cleavage agents used, either possess a free or an esterified hydroxy group.

In accordance with the present invention, the manufacture of vitamin A-active pentaenes may, for instance, be effected as follows: beta-ionone is condensed with 3-hydroxy-3-methyl-hexene-(1)-yne-(5) by means of 2 mols of ethyl magnesium bromide in an ether solution. After hydrolysis with a solution of ammonium salt, 1 mol of hydrogen is added to the triple bond of the resulting condensation product by using a palladium-calciumcarbonate catalyst. The resulting 3,7-dihydroxy-3,7-dimethyl-9-(2',6',6'- trimethyl-cyclohexene - (1')-yl) - nonatriene-(1,5,8) is boiled with acetic acid anhydride in presence of anhydrous sodium acetate. A modification of this process consists in effecting the allyl rearrangement and dehydration by treatment with acetyl chloride and pyridine or by boiling with a small quantity of iodine in a diluent of boiling point 80–120° C.

By the process described above, pentaenes are obtained corresponding in their chemical and biological properties to the vitamin A and its esters obtained from natural sources. The products obtained in accordance with the present process are, in particular, characterised by the absorption maxima at 310 and 325 mµ in the ultraviolet absorption spectrum and by the absorption maxima at 580 and 620 mµ in the Carr-Price reaction. The resulting esters can be saponified in the usual manner.

The pentaenes thus obtained can be purified by the same methods as high concentrates of vitamin A and vitamin A esters obtained from natural sources. (Separation between solvents, fractionated precipitation from alcoholic solution, careful distillation, chromatographic adsorption and crystallisation of the free alcohol and suitable derivatives.) Like vitamin A preparations from natural sources, the products have to be protected against the deteriorating effects of light, air, and heat. It is of advantage to add antioxidants, which may also be present during the whole synthesis; tocopherols are particularly suitable for this purpose.

*Example 1*

In the course of half-an-hour, while stirring in a nitrogen atmosphere at 0° C., 22 parts by weight of 3-hydroxy-3-methyl-hexene-(1)-yne-(5) in 100 parts by volume of ether are added to an ethyl-magnesium-bromide solution (prepared from 9.7 parts by weight of magnesium chips and 56 parts by weight of ethyl bromide in 140 parts by volume of ether). Thereupon, the mixture is refluxed for 4 hours. Two layers result, the lower, dark layer containing the di-magnesium-bromide compound of 3-hydroxy-3-methyl-hexenine. While stirring and cooling to 0° C., a solution of 36.4 parts by weight of beta-ionone in 100 parts by volume of ether is now added in the course of one hour; the condensation is completed by stirring for 2 hours at room temperature. The resulting magnesium salt is decomposed by pouring on 200 parts by weight of ice and 40 parts by weight of ammonium chloride. The ether solution is washed with dilute acetic acid, sodium-bicarbonate solution and water, dried with sodium sulphate and the solvent as well as unchanged 3-hydroxy-3-methyl-hexenine-(5) are evaporated, whereby, ultimately, the mixture is heated in a water-jet vacuum to 60° C. The residue consists of 3,7-dihydroxy-3,7-dimethyl - 9-(2',6',6'-trimethyl - cyclohexene-(1')-yl)-nonadiene-(1,8)-yne-(5) and a little unchanged beta-ionone. Yield: 52.4 parts by weight or 91.5 per cent of the theoretical.

An analytically pure condensation product is obtained by chromatographic adsorption on 20 times the quantity of aluminum oxide which has been deactivated with 12 per cent. of water. Thereby, the desired condensation product is adsorbed onto the aluminum oxide, while the beta-ionone, as well as impurities that may have been formed by splitting off of water, can be washed out with petroleum ether and benzene. The product thus purified is a yellowish, viscous oil which does not adsorb ultraviolet rays of greater wave length than 270 mµ.

10 parts by weight of pure 3,7-dihydroxy-3,7-dimethyl - 9-(2',6',6' - trimethyl - cyclohexene - (1')-yl)-nonadiene-(1,8)-yne-(5) are dissolved in 150 parts by volume of methyl alcohol and hydrogenated at room temperature in the presence of 0.2 parts by weight of 4 per cent. palladium-calciumcarbonate catalyst. It is of advantage to add 0.05 part by weight of tocopherol and 0.1 part by weight of pyridine before the hydrogenation takes place. When 850 parts by volume of hydrogen (740 mm. Hg, 20° C.) have been taken up, the hydrogenation is interrupted, the catalyst filtered by suction and the filtrate concentrated in vacuo. Pure 3,7-dihydroxy-3,7-di-methyl-9-(2',6',6'-trimethyl-cyclohexene - (1') - yl)-nonatriene-(1,5,8) is obtained, in a yield of 95 per cent., as a yellowish oil, which does not absorb ultraviolet rays of greater wave length than 270 mµ.

10 parts by weight of this product of the partial hydrogenation are dissolved in 50 parts by volume of acetic acid anhydride, treated with 5 parts by weight of anhydrous sodium acetate and refluxed for 2 hours while excluding light. Thereupon, excess acetic acid anhydride and the resulting glacial acetic acid are evaporated in vacuo and the residue is taken up in petroleum ether of boiling point 30–60° C. and water. The petroleum-ether solution is successively washed with sodium-bicarbonate solution and water, dried with sodium sulphate and evaporated. The remaining brown oil is fractionated in a molecular still. Thereby, apart from an unimportant first running, 6–8 parts by weight of a yellow oil of boiling point 80–90° C. ($10^{-5}$ mm. Hg) are obtained which shows a marked absorption in the ultraviolet spectrum at 325–328 mµ and which is very active in the growth test on vitamin A—deficient rats.

In the elementary analysis, the vitamin A acetate thus obtained gives values which correspond to the formula $C_{22}H_{32}O_2$. However, the compound contains isomeric admixtures which possess an absorption maximum at 310 mµ in the ultraviolet absorption spectrum. The separation of these isomeric compounds is effected by the usual chromatographic methods and by fractionated precipitation and crystallisation, respectively, of the vitamin A alcohol obtained by saponification, as well as of its crystallising derivatives.

*Example 2*

10 parts by weight of non-purified 3,7-dihydroxy-3,7-dimethyl-9-(2', 6', 6'-trimethyl-cyclohexene-(1')-yl)-nonadiene-(1,8)-yne-(5) (prepared in accordance with Example 1) are dissolved in 100 parts by weight of methyl alcohol and hydrogenated at room temperature in the presence of 0.2 part by weight of 4 per cent. palladium-bariumsulphate catalyst. When 800 parts by volume of hydrogen (740 mm. Hg, 20° C.) have been taken up, the hydrogenation is interrupted and the hydrogenation solution is worked up as described in Example 1. The yield amounts to 90–95 per cent.

The 3,7-dihydroxy-3,7-dimethyl-9-(2', 6', 6'-trimethyl - cyclohexene - (1') - yl) - nonatriene - (1,5,8) is treated further as indicated in Example 1. On fractionating in a molecular still, one obtains 3–4 parts by weight of a first running of boiling point 30–70° C. ($10^{-5}$ mm. Hg) and 4–6 parts by weight of pure acetate of boiling point 80–90° C. ($10^{-5}$ mm. Hg), which corresponds to the product of Example 1.

*Example 3*

100 parts by volume of toluene and 0.05 part by weight of iodine are dehydrated by evaporation of a first running at slightly reduced pressure in a nitrogen atmosphere at a boiling temperature of 90° C. Under continual distillation of toluene, a solution of 2.5 parts by weight of 3,7-dihydroxy-3,7-dimethyl-9-(2',6',6'-trimethyl-cyclohexene-(1')-yl)-nonatriene-(1,5,8) (described in Example 1) in 20 parts by volume of toluene is allowed to flow in slowly. In order to avoid destruction, a small quantity of tocopherol is added to the reaction mixture as antioxidant. Finally, still at a temperature of 90° C., 20 parts by volume of toluene are evaporated and the reaction solution is diluted with ether. The product is successively washed with sodium-thiosulphate solution and water, dried and the solvent is evaporated. On further working-up in accordance with Example 1, a yellowish oil of boiling point 80–90° C. at $10^{-5}$ mm. Hg is obtained which absorbs the ultraviolet rays at 310 and 325 m$\mu$ and which, in the Carr-Price reaction, shows the characteristic absorption maxima of vitamin A at 620 and 580 m$\mu$. In the growth test on vitamin A-deficient rats, the oil shows a marked action on the growth and cures the eye symptoms (xerophthalmia) of vitamin A deficiency. In the elementary analysis, the distilled product gives values which correspond to the formula $C_{20}H_{30}O$. As in Example 1, here, too, isomeric admixtures are present, besides vitamin A.

Instead of using a small quantity of iodine itself, the same result as described in this example may be obtained by treatment with a compound which easily splits off iodine, such as, for instance, hydrogen iodide, phosphorus diiodide, iodopyridine nitrate, etc.

As to the diluents, inert solvents of melting point 80–120° C. are generally suitable. Petroleum ether of boiling point 80–120° C., in particular, has been used with advantage.

*Example 4*

1 part by weight of 3,7-dihydroxy-3,7-dimethyl-9-(2',6',6'-trimethyl-cyclohexene-(1')-yl)-nonatriene-(1,5,8), prepared in accordance with Example 1, is dissolved in 4 parts by weight of pyridine and 2 parts by weight of acetyl chloride in presence of 15 parts by volume of dichloroethane as diluent and kept at 25° C. for 60 hours. The reaction solution is taken up in ether, successively washed with aqueous sodium-bicarbonate solution, dilute sulphuric acid and water, dried with sodium bicarbonate, evaporated and worked up as described in Example 1. The product obtained in accordance with the present process shows absorption maxima at 310 and 325 m$\mu$ in the ultraviolet spectrum; in the Carr-Price reaction, it proves to have absorption maxima at 620 and 580 m$\mu$, as specific to vitamin A acetate.

The allyl rearrangement and splitting off of water can be effected in the same manner on heating with acetyl chloride and glacial acetic acid, whereby ether or benzene are added as diluents.

We claim:

1. Process which comprises condensing β-ionone with the Grignard of 3-hydroxy-3-methyl-hexene-1-yne-5 to yield the Grignard of 3,7-dihydroxy-3,7-dimethyl-9-[2',6',6'-trimethyl-cyclohexene-(1')-yl]-nonadiene-1,8-yne-5.

2. Process according to claim 1 which comprises hydrolyzing the resulting Grignard to the corresponding 3,7-dihydroxy compound.

3. Process according to claim 2 followed by the reduction of the 3,7-dihydroxy compound to the corresponding nonatriene 1,5,8.

4. Process which comprises hydrolyzing the Grignard of 3,7-dihydroxy-3,7-dimethyl-9-[2',6',6'-trimethyl-cyclohexene-(1')-yl]-nonadiene-1,8-yne-5 to the corresponding 3,7-dihydroxy-compound.

5. Process which comprises reducing 3,7-dihydroxy-3,7-dimethyl-9-[2',6',6'-trimethyl-cyclohexene-(1')-yl]-nonadiene-1,8-yne-5 to the corresponding nonatriene 1,5,8.

6. Process according to claim 5 in which the reduction is effected by partial hydrogenation.

7. Process according to claim 6 followed by rearrangement and dehydration of the nonatriene 1,5,8, to produce a vitamin A active compound.

8. Process according to claim 7 in which the rearrangement and dehydration is effected by means of an acylating agent.

9. Process according to claim 8 in which the acylating agent is acetic anhydride.

10. As a new product, the di-Grignard of 3,7-dihydroxy-3,7-dimethyl-9-[2',6',6'-trimethyl-cyclohexene-(1')-yl]-nonadiene-1,8-yne-5.

11. As a new product, 3,7-dihydroxy-3,7-dimethyl-9-[2',6',6'-trimethyl-cyclohexene-(1')-yl]-nonadiene-1,8-yne-5.

12. As a new product, 3,7-dihydroxy-3,7-dimethyl-9-[2',6',6'-trimethyl-cyclohexene-(1')-yl]-nonatriene 1,5,8.

13. Process which comprises partially hydrogenating 3,7-dihydroxy-3,7-dimethyl-9-[2',6',6'-trimethyl-cyclohexene-(1')-yl]-nonadiene-1,8-yne-5 to the corresponding nonatriene-1,5,8 and rearranging and dehydrating said nonatriene by means of acetylchloride to a vitamin A active compound.

14. Process which comprises partially hydrogenating 3,-7-dihydroxy-3,7-dimethyl-9-[2',6',6'-trimethyl-cyclohexene-(1')-yl]-nonadiene-1,8-yne-5 to the corresponding nonatriene-1,5,8 and rearranging and dehydrating said nonatriene by means of iodine to a vitamin A active compound.

15. A compound selected from the group consisting of the di-Grignard of 3,7-dihydroxy-3,7-dimethyl-9-[2',6',6'-trimethyl-cyclohexene-(1')-yl]-nonadiene-1,8-yne-5, 3,7-dihydroxy-3,7-dimethyl-9-[2',6',6'-trimethyl-cyclohexene-(1')-yl]-nonadiene-1,8-yne-5, and 3,7-dihydroxy-3,7-dimethyl-9-[2',6',6'-trimethyl-cyclohexene-(1')-yl]-nonatriene 1,5,8.

OTTO ISLER.
ALBERT BUSINGER.

REFERENCES CITED

The following references are of record in the file of this patent:

UNITED STATES PATENTS

| Number | Name | Date |
|---|---|---|
| 2,369,161 | Milas | Feb. 13, 1945 |

OTHER REFERENCES

Heilbron et al. Chem. Soc. Jour. (1942), 727–33; ibid. (1945), 84–87 and 90–94.